March 29, 1932. R. H. ROGERS 1,851,774
METHOD AND APPARATUS FOR SURVEYING WELLS
Filed April 20, 1929
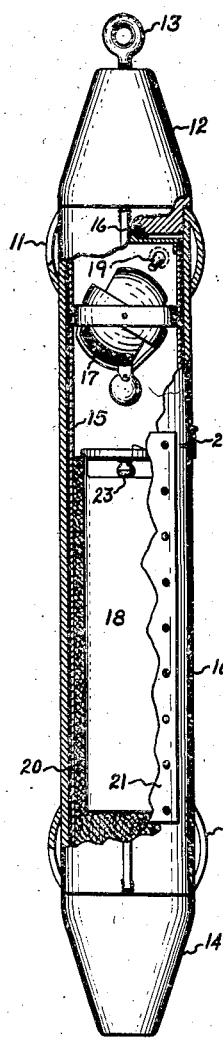
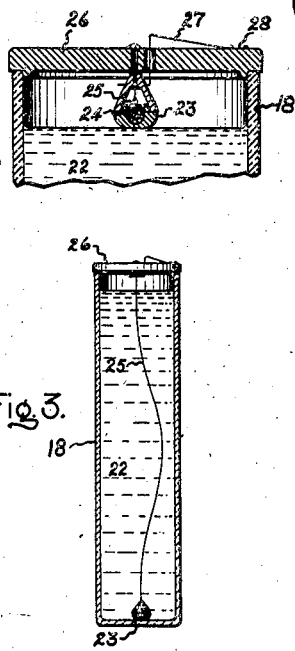
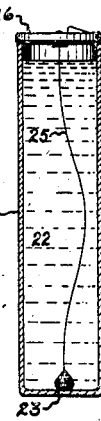
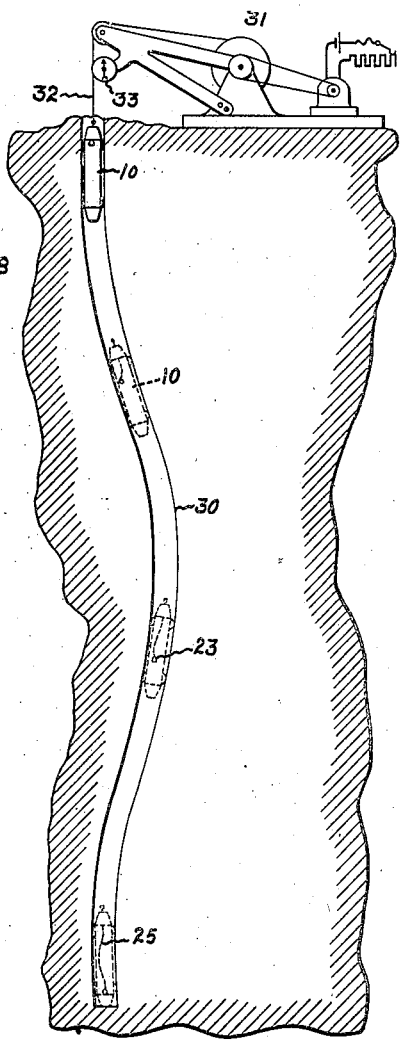
Inventor:
Robert H. Rogers,
by Charles E. Muller
His Attorney.

Patented Mar. 29, 1932

1,851,774

UNITED STATES PATENT OFFICE

ROBERT H. ROGERS, OF SCHENECTADY, NEW YORK, ASSIGNOR TO GENERAL ELECTRIC COMPANY, A CORPORATION OF NEW YORK

METHOD AND APPARATUS FOR SURVEYING WELLS

Application filed April 20, 1929. Serial No. 356,869.

My invention relates to a method and apparatus for recording movements which may occur in a plurality of planes and while the invention is by no means limited thereto is especially adapted for surveying the meanderings of underground bore hole such as oil wells and will be described for such use. An object of the invention is to provide apparatus of this general character which will produce accurate records.

In the form of my invention adapted for the survey of wells I employ a transparent tubular container containing a transparent viscous liquid. The container is of such size and shape as to be capable of being lowered into the well to be surveyed at a uniform rate and to be tilted in accordance with the changes in direction of the well as it descends. Coincident with the lowering of the container into the well a small weight is allowed to descend through the viscous liquid. The weight always moves straight down at a rate determined by the force of gravity and viscosity of the liquid regardless of the angle of tilt of the container and so traces a meandering path through the viscous liquid which is just reverse to the meanderings of the well hole which cause the container to tilt during its descent. The weight in its descent leaves a record of its path of travel through the viscous liquid. Preferably this is accomplished by making the weight hollow and providing a coil of light thread therein which is permitted to pay out behind the weight as it descends. The liquid is sufficiently viscous to hold the thread in suspension in the path traced by the weight, thus leaving a permanent record. The rate of descent of the container is preferably timed so that the container will reach the bottom of the well at the same time the weight reaches the bottom of the container. The apparatus is then removed from the well and the container rotated on its vertical axis 180 degrees and the thread then represents an exact small scale tracing record of the meanderings of the well in all directions. This record may be photographed or traced from desired angles and the records kept for future reference. The thread and weight may then be pulled out and the apparatus put in condition for taking another record. A protective casing suitably provided with auxiliary features to make the device practicable and prevent the container from rotating on its axis during its descent is also provided.

The features of my invention which are believed to be novel and patentable will be pointed out in the claims appended hereto. For a better understanding of the invention reference is made in the following description to the accompanying drawings which represent in Fig. 1 a view, partially in section, of a preferred embodiment of the assembled container and casing; Fig. 2 shows the details of the weight and releasing arrangement in the top of the container; Fig. 3 represents the container as it would appear after taking a record; and Fig. 4 represents the manner of surveying a well with the apparatus.

Referring to the drawings and particularly to Fig. 1, 10 represents the protective casing. It may be made of steel and when closed is preferably water-tight. It is provided with suitable guiding lobes 11 at top and bottom to loosely fit the bore of the well. The top 12 is removable and carries an eye-bolt 13 for attaching the lowering cable. The bottom 14 is preferably somewhat pointed as shown to facilitate the lowering operation. Mounted within this protective casing is a second casing 15 rotatably supported at top and bottom by suitable bearings one of which is shown at 16. This casing may be made in skeleton form if desired. The casing 15 contains a gyroscope 17 and the liquid container 18. The gyroscope is employed to prevent the inner casing 15 from rotating during its descent and subsequent ascent irrespective of whether or not the outer casing 10 rotates. Since the gyroscope needs to be in operation only a short period during the descent and ascent of the container I do not consider it necessary to provide special means for keeping it in operation. The gyroscope may be given an initial high speed of rotation as by the blast from an air hose directed against the periphery of its rotating element for a few minutes prior to the surveying operation. I have indicated a nozzle at 19 for this pur- -pose. This nozzle may be connected with a compressed air hose through a suitable opening in the outer casing opposite the nozzle.

The lower portion of the inner casing is preferably lined with a heat insulating packing material indicated at 20. This cushions the glass container 18 and prevents appreciable changes in temperature while the container is being used to take a record. The two casings are provided with side doors or openings, the door in the outer casing being indicated at 21, in order that the recording container may be inserted and removed without disturbing the gyroscope.

The container 18 is preferably either made of glass so as to be transparent or has transparent windows in order to view the interior record and is substantially filled with a very viscous transparent liquid 22. Strained honey may be used for this purpose. A resinous condensation product made for example of glycerine and phthalic anhydride dissolved in acetone has the desired viscous and transparent characteristics to make it suitable for use in my recording apparatus. Such condensation products are on the market under the trade name "Glyptal". Other suitable liquids may be used for this purpose and differences in the degree of viscosity may be taken care of by correspondingly changing the rate at which the container is lowered into the well during a recording operation or by changing the viscosity of the liquid selected by changing its temperature. The degree of viscosity desired will also depend somewhat on the depth of the well to be surveyed.

The details of a suitable recording weight are shown in Fig. 2 at 23. The weight is made hollow and has upper and lower sections that may be screwed together. It will be evident that the weight may be altered by loading more or less with lead shot as indicated at 24 to take care of differences in viscosity of the liquid, depth of well and rate of lowering. Since three of these factors may be readily altered the same apparatus is suitable for surveying holes of greatly varying depth. The upper portion of the hollow weight contains a loosely coiled thread 25 or light cord one end of which is carried through a small opening in the top of the weight and secured to the cover 26 of the container in its center.

The weight or part as shown in Fig. 2 is in condition to start a recording operation. The weight is held in this position by any suitable contrivance until the recording operation is started and then the weight is released. The weight may be secured in the position shown in Fig. 2 by a small amount of sealing wax and released by depressing a wire spring member indicated at 27. This wire is fastened to the cover at 28, is bent down through an opening in the cover adjacent the weight, and has a loop surrounding the conical upper portion of the weight. When the wire 27 is depressed the spring breaks the weight away from its sealing wax and the weight is then free to descend paying out the thread as it goes. The weight may be released by running a stick through suitable openings in the casings. A cover for such opening is indicated at 29, Fig. 1. The opening at the top of the weight is not large enough to permit the heavy viscous, liquid to enter into the hollow portion but as soon as the weight enters the liquid the latter pulls the thread out and leaves it suspended in the path taken by the weight as indicated in Fig. 3.

In Fig. 4 I have represented the use of the apparatus in surveying a well indicated at 30. The electric motor operated reel represented at 31 may be a portion of the regular well drilling or drill hoisting equipment. The cable 32 is shown secured to my recording apparatus in position to start a recording operation. A speed indicator as represented at 33 is provided to indicate the rate of lowering of the apparatus.

Prior to the recording operation the depth of the well is determined. The rate at which the weight will fall through the liquid at any given temperature is of course determined in advance by suitable calibration. The temperature of the viscous liquid 22 and the weight 23 are altered as required to arrive at some definite calibration suitable for the depth of the well to be surveyed. Then the lowering speed to be used is determined in order that the apparatus will reach the bottom of the well at the same time the weight reaches the bottom of the container. Then the gyroscope is brought up to speed and the weight 23 released and the apparatus lowered to the bottom of the well at the uniform desired rate. The action and relative position of weight 23 as the apparatus is lowered at several different positions and inclinations in the well is indicated in dotted lines in Fig. 4. The device is moved over the path of the well, the container or part 18 is tilted from a vertical axis in accordance with the inclinations of the well from the vertical as it descends, the relatively moveable part or weight 23 being acted upon by the force of gravity has a simultaneous component of movement in a fixed direction parallel to a vertical line and the relative movements of these parts are recorded by the string 23.

The apparatus is then pulled out, the container 18 removed from the casing and oriented about its vertical axis 180 degrees and the position of the thread 25 represents an exact small scale record of the meanderings of the well in all directions. Fig. 3 represents the oriented record of the well shown in Fig. 4.

This record will remain permanent as long as desired if the liquid is kept cool. It may be viewed and photographed from any angle and gives a very complete and desirable type of record.

Such a recording device produces an unusual type of record and may be used to advantage in many different applications. It is evident for example that such a recording container as is shown in Fig. 3 might be mounted on an air ship to record the various degrees of tilt of the ship during a trip. Again such a container might be suspended from its top and exposed to the wind or to the flow of a stream of water so as to be tilted thereby to obtain a record of variations in the direction and rate of flow. These and other uses of the apparatus will occur to those skilled in the art.

In accordance with the provisions of the patent statutes I have described the principle of operation of my invention together with the apparatus which I now consider to represent the best embodiment thereof but I desire to have it understood that the apparatus shown and described is only illustrative and that the invention may be carried out by other means.

What I claim as new and desire to secure by Letters Patent of the United States, is:

1. In a recording apparatus, a container, a viscous liquid in said container, a gravity operated recording element free to move in said liquid, and means associated with said recording element for leaving a permanent record of its path in said liquid.

2. In a recording apparatus, a container, a viscous liquid in said container, a weight free to move through said liquid at a rate determined by the force of gravity and the viscosity of the liquid, and means associated with said weight for tracing a permanent record of its path of movement through said liquid.

3. In a recording apparatus, a transparent container, a transparent viscous liquid in said container, a weight free to move through said liquid at a rate determined by the force of gravity and the viscosity of the liquid, and a thread supported by and adapted to be paid from said weight by the movement through said liquid for leaving a permanent record of its path therethrough.

4. In a recording apparatus, a transparent container, a transparent viscous liquid in said container, recording means movable through said liquid, and means given off from said recording element as it moves, for leaving a record of its path through said liquid.

5. In a recording device having a container, a viscous liquid in said container and means for preventing said container from rotating about an axis, but permitting universal tilting movements, the combination of a weight which is permitted to move by the force of gravity through said liquid, and means given off from said weight as it moves for leaving a record of its path to record tilting movements of said container.

6. Recording apparatus for recording the departure from a vertical line of vertically constructed holes, comprising a container containing a transparent viscous liquid, means for passing said container through the hole to be examined at a uniform rate while maintaining an axis of the container parallel with the adjacent axis of the hole, a weight which is permitted to move by gravity through said liquid during its passage through such hole, and means given off by said weight for leaving a record of its path of movement through the liquid.

7. Apparatus for surveying the meanderings of wells comprising an oblong cylindrical casing of such dimensions as to loosely fit in the bore of the well to be surveyed, a cylindrical glass container within said casing containing a transparent viscous liquid, a weight which is permitted to descend by gravity through said liquid, a thread carried by said weight and arranged to be paid off by the movement of said weight through the liquid to leave a record of its path of travel, and means for lowering said casing from the top to the bottom of the well during the period required for said weight to descend through said liquid.

8. The method of operating a device including two relatively movable parts to determine the meanderings of a path which includes moving said device over the path to follow its meanderings while simultaneously exerting a force in a fixed direction to move one part with relation to the other and making a record of the relative motion between said relatively movable parts.

9. The method of determining variations in the inclinations of a body in any direction with respect to its vertical axis which consists in a simultaneous movement of a second body with the first mentioned body and in addition giving said second body a component of movement in a vertical direction and recording the relative movements of such bodies.

10. The method of determining the meanderings of a path in any direction with respect to a given line which includes moving an element over the path to follow its meanderings while simultaneously moving a second element therewith and giving said second element an additional component of movement in a direction parallel to said given line and recording the relative movements of such elements.

11. The method of determining the meanderings of a path in any direction with respect to a given line which includes moving an element over the path at a substantially uniform rate to follow its meanderings while simultaneously moving a second element therewith and giving said second element a substantially uniform movement parallel to said given line and recording the relative movement of such elements.

12. The method of determining the meanderings of oil wells and the like which consists in lowering a device into said well, tilting said device as it is lowered in accordance with the inclinations of the well from a vertical axis, simultaneously moving an element with said device and giving said element a component of movement relative to said device in a vertical direction regardless of the degree of tilt of said device, and recording the relative movement of said element with respect to said device.

In witness whereof, I have hereunto set my hand this 19th day of April, 1927.

ROBERT H. ROGERS.